United States Patent [19]

Baker

[11] 3,805,255

[45] Apr. 16, 1974

[54] SCANNING LIGHT EMITTING DIODE DISPLAY OF DIGITAL INFORMATION

[75] Inventor: C. Mark Baker, Santa Clara, Calif.

[73] Assignee: Hewlett-Packard Company, Palo Alto, Calif.

[22] Filed: Sept. 21, 1972

[21] Appl. No.: 290,906

[52] U.S. Cl. ......... 340/172.5, 340/324, 235/92 CA, 235/92 SH, 235/92 EA

[51] Int. Cl. ......................... G08b 5/36, H03k 21/18

[58] Field of Search ..... 340/172.5, 324; 235/92 EA, 235/92 SH, 92 CA

[56] References Cited

UNITED STATES PATENTS

| | | | |
|---|---|---|---|
| 3,683,159 | 8/1972 | Welch et al. | 235/92 EA |
| 3,416,133 | 12/1968 | Hunkins et al. | 235/92 EA |
| 3,636,319 | 1/1972 | Nixon | 235/92 EA |
| 3,696,396 | 10/1972 | Ceschini | 235/92 EA |
| 3,587,062 | 6/1971 | Jen | 340/172.5 X |
| 3,555,519 | 1/1971 | Nercessian | 340/172.5 |
| 3,651,481 | 3/1972 | Evans et al. | 340/172.5 |
| 3,581,065 | 5/1971 | Hatsukano | 235/92 EA |

*Primary Examiner*—Paul J. Henon
*Assistant Examiner*—Mark Edward Nusbaum
*Attorney, Agent, or Firm*—Roland I. Griffin

[57] ABSTRACT

A digital logic display in which a row of light emitting diodes (LED's) is used to indicate the logic state of each bit of a sequence of bits present at one input. Another row of light emitting diodes is used in one mode to indicate the logic state of each bit of a sequence of bits present at another input, and in another mode to indicate the logic state of each bit of a sequence of bits that result from performing a preselected Boolean operation on corresponding bits of the two input sequences. By means of associated digital circuitry, the original input bit sequences are broken up into shorter sequences which are cycled in closed loops in a series of shift registers, thereby preserving the original data intact while sampled bits are subjected to preselected Boolean operations. Also this procedure facilitates the use of a scanning mechanism whereby each output LED is responsive to the logic state of selected bits only periodically.

6 Claims, 2 Drawing Figures

SCANNING LIGHT EMITTING DIODE DISPLAY OF DIGITAL INFORMATION

BACKGROUND OF THE INVENTION

The ever increasing use of digital electronics has created a need for display devices which are particularly suited to the display of digital information. In computer applications, for example, the information of interest is generally a sequence of voltages or bits, each bit of which may be "high" or "low." It is desirable to display a particular sequence of such bits, say 16 or 32 bits long in a simple way, for example, by using a sequence of lights indicating the "high" or "low" status of each bit. Such display devices are to be found in the prior art, some of which include provisions for displaying information from more than one input channel simultaneously.

Also of importance in digital applications is an instrument which can perform various Boolean functions between corresponding bits in different channels. One useful function that may be performed is the "A exclusive or B" operation in which a high level results whenever the compared bits are different. A display of this function can be used to compare bit sequences from a functioning digital device with bit sequences from a malfunctioning device. Any "on" bit in the display of the Boolean function indicates a bit pattern at the test point in the malfunctioning unit which differs from the pattern produced by the functioning device. The capability of performing this particular Boolean function has also found its way into the prior art. But there are other Boolean functions also of interest, and it would be desirable to have a display instrument with the capability of displaying these. Of importance are the following functions: "A and B," in which a high level results whenever corresponding bits in the two channels are both high; "A or B," in which a high level results whenever a high level is present in either channel.

Furthermore, it would be desirable to perform the Boolean functions without destroying the original input data. In that case, data could be read in and subjected to the various Boolean operations seriatim, including a return to the display of the original data.

SUMMARY OF THE INVENTION

Accordingly, it is an object of the present invention to provide a digital display device which in one mode can display digital information from two different channels by means of a series of lights, and which in another mode can display the sequence of bits resulting from performing one of the Boolean functions, "A exclusive or B," "A and B," "A or B" on corresponding bits of the two channels.

It is a further object of the invention to provide the capability of performing the various Boolean operations on the input data, while storing the original data unchanged for later use or display.

The aforementioned objectives are achieved in the present invention by storing each channel of input data in a 32 bit register. Periodically, the data in each of these registers is parallel loaded into four eight-bit shift registers, in each of which the eight bits are shifted continuously in a closed loop. This procedure allows scanning of the output light emitting diode display by presenting each of the eight bits in the eight-bit shift register sequentially to the anode driver of eight light emitting diodes. However, the cathode of only one of these diodes is pulled low at this time, and hence only this diode will light if the bit presented to the anode is high.

When a Boolean function is desired, the bits sampled from corresponding registers in each of the input channels are directed to the desired Boolean functional block, the output of which is then sampled by one set of light emitting diodes in the manner heretofore described. Regardless of whether the input data itself or a Boolean function of that data is displayed, the original data continues looping the eight-bit shift registers and can be accessed at any time.

DESCRIPTION OF THE PREFERRED EMBODIMENT

Figure 1:
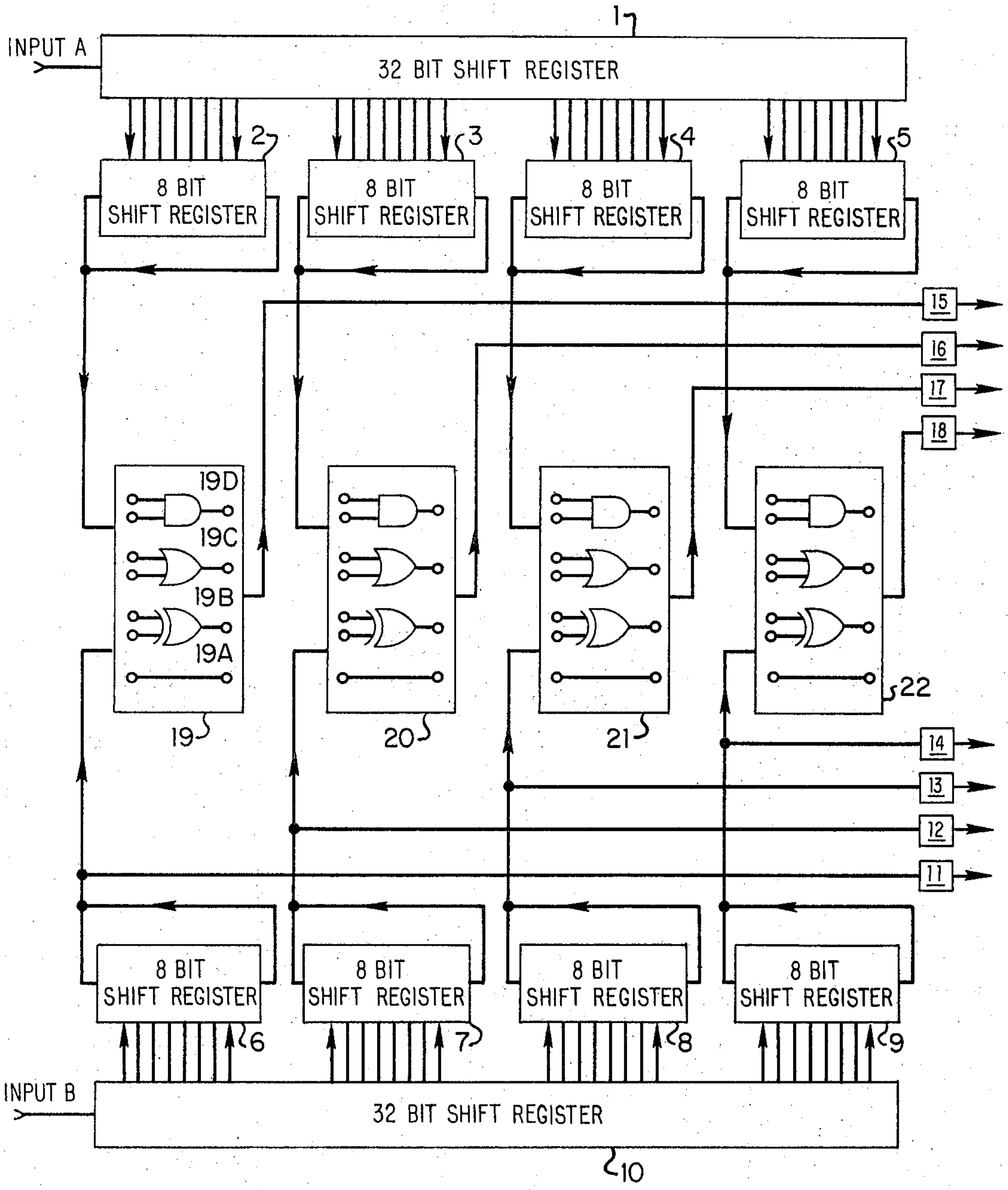
FIG. 1 is a block diagram of the preferred embodiment of the input, storage, and Boolean function sections of the present invention.

Referring to FIG. 1, input data in the form of a sequence of 32 bits is loaded serially into a 32-bit shift register 1 at input A. Another bit sequence is loaded into a similar shift register 10 at input B. At the end of a load cycle the bits in shift register 1 are parallel loaded into four eight-bit shift registers 2, 3, 4, 5, while the bits in shift register 10 are parallel loaded into four eight-bit shift registers 6, 7, 8, 9. The eight bits of information in each eight-bit shift register are then circulated in a closed loop in that register. One terminal of each eight-bit shift register serves as an output, so that the eight bits are presented sequentially at the output, each bit appearing once during a complete rotation cycle. Consider for example, shift register 6, in which the first eight bits of information from channel B are circulating. The bit appearing at the output of that register is directed to an anode driver 11, which may be, for example, a pnp transistor. The anode driver serves to isolate the digital circuitry of FIG. 1 from the light emitting diode display 23 of FIG. 2, and also to pull high the anodes of the first eight light emitting diodes of that display. Only one particular LED will respond to the signal, however, because only one particular cathode is simultaneously pulled low in a manner to be discussed fully below. This "scanning" of the cathodes assures that the $n^{th}$ LED of the first eight LED's of the display is responsive only to the logic state of the $n^{th}$ bit of the eight bits circulating in register 6.

The remaining 24 bits of channel B are treated in an identical manner using the eight-bit shift registers 7, 8, 9, and the anode drivers 12, 13, 14. In this way a row of 32 scanned LED's 23 are used to display the data of channel B.

In one basic mode of operation of the invention another row of 32 scanned LED's 25 may be used in the same way to display directly the input data of channel A. But in other operating modes it is possible to display instead the results of certain Boolean operations performed on corresponding bits of the two input channels. This is accomplished by directing the output of each of the eight-bit shift registers 6, 7, 8, 9, containing the channel B data and the output of each of the eight-bit shift registers 2, 3, 4, 5, containing the channel A data to one of the functional circuit blocks 19, 20, 21, 22, of FIG. 1. For example, in addition to being sent to anode driver 11, sampled bits from shift register 6, are sent also to functional circuit block 19. The other input to functional circuit block 19 is the bit sampled from eight-bit shift register 2 which contains the first eight bits from channel A. The functional circuit block 19 contains different circuit elements 19A, 19B, 19C, 19D which perform different Boolean operations on two logic bits presented at their inputs, and a switch (not shown) for selecting among these elements. The elements which are commercially available are: (1) A conductor 19A which presents as output the bit from shift register 2 (this operation simply displays directly the data in channel A); (2) An "exclusive or" gate 19B which performs "A exclusive or B" on its two inputs, thereby producing a high level output whenever the input bits are in different logic states; (3) An "or" gate 19C which performs "A or B" on its two inputs thereby producing a high level output whenever either input bit is in a high state; (4) An "and" gate 19D which performs "A and B" on its two inputs, thereby producing a high level output only when both the input bits are in a high state. The output of the selected Boolean function element from function circuit block 19 is directed to anode driver 15, which drives the anodes of the first eight light emitting diodes of the second LED display 25 in FIG. 2. Again, however, as was the case with the channel B display, the scanning of the LED's assures that only one particular diode of the eight will respond to the signal from the particular anode driver 15.

The remaining 24 bits of information from channels A and B are operated on by the function circuit blocks 20, 21, 22. The outputs are applied to the anodes of the remaining LED's in LED display 25 using the anode drivers 16, 17, 18 in the manner discussed above in connection with function circuit block 19.

Now, the LED "scanning" operation mentioned above may be more fully explained with reference to FIG. 2. As was indicated above, the first eight bits of data from channel B circulate in a closed loop in shift register 6. The register is sampled so that the bits are sequentially presented to anode driver 11 in FIG. 1. If the sampled bit is in a logic high state, the anode driver 11 will simultaneously drive high the anodes of the first eight light emitting diodes 23. At the same time however, a cathode driver 24 pulls low the cathode of only one of these eight diodes. This cathode driver, shown schematically, may comprise an eight bit shift register containing just one bit circulating at the same frequency as the bits in shift registers 2 – 9 and eight npn transistors, each connected to a different one of the cathode lines 26. When the circulating bit is presented to a particular one of these transistors, that transistor pulls low the cathode line to which it is connected. It is evident that in the display 23 only one diode in each group of eight diodes will have its cathode pulled low when the cathode driver activates a particular one of the cathode lines 26. The circulation of the bit in the shift register of the cathode driver is synchronized with the circulation of the bits in the registers 2 – 9 to assure that when the anode driver 11 samples the *nth* bit from the register 6, the cathode driver simultaneously activates the cathode of the *nth* LED in the first group of eight LED's. In this way the first eight diodes are continuously scanned, the *nth* one of the diodes lighting once in each scanning cycle, provided that the *nth* bit of the first eight bits in channel B is in a high state. The scanning rate is sufficiently high so that the human eye cannot detect the resulting flickering of the diode. Thus the "on" or "off" state of the first eight lights in the display will correspond to the high or low logic states of the first eight bits in channel B, there being one anode driver activating all the anodes of each such group, while each of the cathode lines 26 activates the *nth* cathode in the group at the same time as the *nth* bit of that group is being sampled at the anodes.

Figure 2:
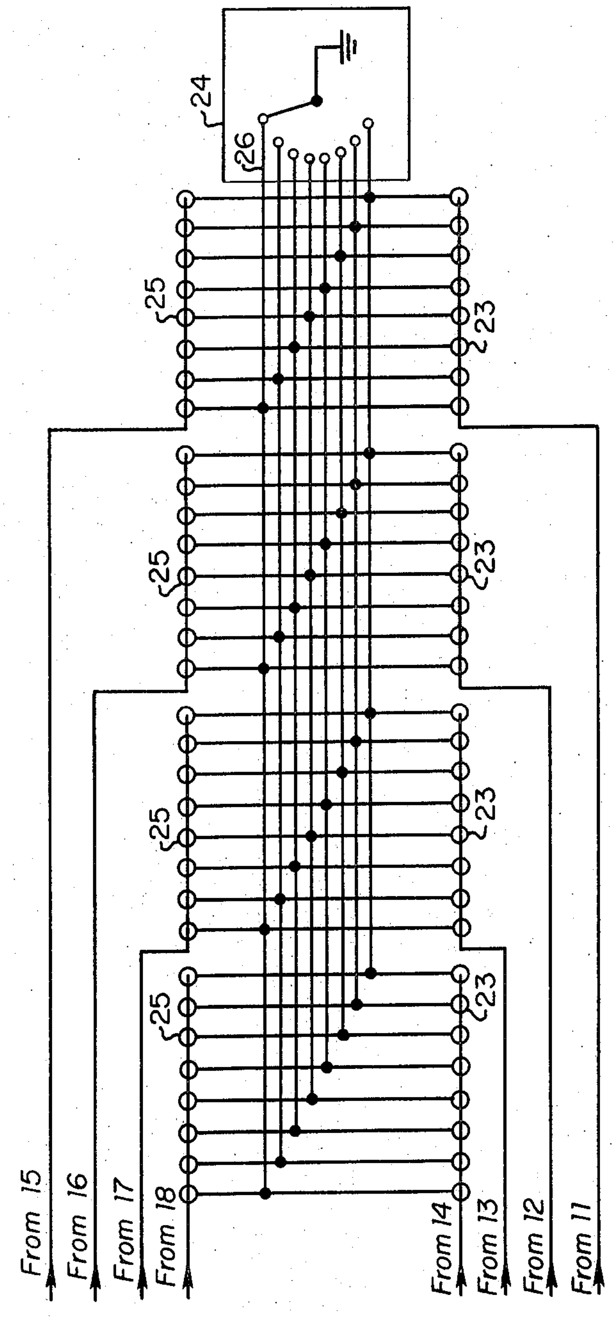
FIG. 2 is a schematic diagram of the preferred embodiment of the display section of the present invention.

From FIG. 2, it can be seen that the cathode driver 24 also serves to drive the cathodes of the row of light emitting diodes 25. The cathode of each LED in this row is connected in parallel with the cathode of a corresponding LED in the channel B display 23. The anodes of these diodes are driven in groups of eight by the anode drivers 15, 16, 17, 18 in the same manner as described above in connection with the channel B display. Since these anode drivers are responsive to signals from the Boolean function selectors 19, 20, 21, 22, the light emitting diodes in this channel will display the logic sequence resulting from a selected Boolean operation performed on corresponding bits in the A and B channels.

Regardless of which mode of operation is selected, the original input data in both channel A and channel B continue cycling in closed loops in the eight-bit shift registers 2 – 9. Thus, the original data is preserved intact during any selected Boolean operation, and is available for further Boolean operations or for direct display at a later time.

I claim:

1. A digital logic display device comprising:

first storage means for storing throughout subsequent manipulations a first sequence of logic bits of a predetermined length presented at a first input terminal of said display device;

second storage means for storing throughout subsequent manipulations a second sequence of logic bits of said predetermined length presented at a second input terminal of said display device;

logic means for performing a plurality of Boolean operations on pairs of corresponding bits from said first and second sequences of logic bits to produce a sequence of Boolean bits of said predetermined length, the logic state of each of said Boolean bits indicating the result of the particular Boolean operation performed on a different one of said pairs of corresponding bits;

first display means for displaying the logic state of each bit in said first sequence of logic bits; and second display means for displaying in a first mode the logic state of each bit in said second sequence of logic bits, and for displaying in a second mode the logic state of each of said Boolean bits whose logic state indicates the result of said particular Boolean operation.

2. A digital logic display device as in claim 1 wherein:

said first display means includes a plurality of members for sequentially sensing the logic state of each of the bits in said first sequence of logic bits, and cathode scanning means for simultaneously enabling only one member of said plurality of members of said first display means to respond to the sensed logic state of each bit; and said second display means includes a plurality of members for sequentially sensing the logic state of each of the bits in said second sequence of logic bits in a first mode, and in a second mode sequentially sensing the logic state of each of the bits in said sequence of Boolean bits, said cathode scanning means simultaneously enabling only one member of said plurality of members of said second display means to respond to the sensed logic state of each bit.

3. A digital logic display device as in claim 2 wherein:

said first storage means comprises a first input shift register coupled to the first input terminal of said display device for receiving said first sequence of logic bits, and a first plurality of smaller shift registers, each connected to said first input shift register to receive as input a particular subsequence of logic bits from said first sequence of logic bits, each smaller shift register operating to circulate the logic bits in said particular subsequence in a closed loop; and said second storage means comprises a second input shift register coupled to the second input terminal of said display device for receiving said second sequence of logic bits, and a second plurality of smaller shift registers, each connected to said second input shift register to receive as input a particular subsequence of logic bits from said second sequence of logic bits, each smaller shift register operating to circulate the logic bits in said particular subsequence of said second sequence of logic bits in a closed loop.

4. A digital logic display device as in claim 3 wherein:

said first display means comprises a first plurality of light emitting diodes divided into groups, the number of diodes in each of the groups being equal to the number of bits in each of said subsequences of said first sequence of logic bits, and a first plurality of anode driving means, each member of said first plurality of anode driving means being connected to the anodes of all of the diodes in a different one of said groups, for activating all of said anodes in response to a logic high state sampled at the output of a different one of said first plurality of smaller shift registers; and said second display means comprises a second plurality of light emitting diodes divided into groups, the number of diodes in each of these groups being equal to the number of bits in each of said subsequences of said second sequence of logic bits, and a second plurality of anode driving means, each member of said second plurality of anode driving means being connected to the anodes of all the diodes in a different one of said last named groups of diodes, for activating all of these anodes in response to a logic high state sampled at the output of a different one of said second plurality of smaller shift registers, or in response to a logic high of each of said Boolean bits sensed at the output of said logic means; and the cathodes of corresponding diodes in each group of said first display means and the cathodes of corresponding diodes in each group of said second display means are electrically connected in common to a cathode line which is periodically activated by said cathode scanning means.

5. A digital logic display device as in claim 4 wherein said logic means comprises a plurality of Boolean function circuit blocks, each including logic elements for performing a plurality of Boolean operations on corresponding bits of said first and second sequences of logic bits, and switching means for selecting among said plurality of Boolean operations.

6. A digital logic display device as in claim 5 wherein said plurality of Boolean function circuit blocks comprises circuit blocks for performing an "EXCLUSIVE OR" function, an "OR" function and an "AND" function.

* * * * *